(12) United States Patent
Mamba et al.

(10) Patent No.: US 8,115,349 B2
(45) Date of Patent: Feb. 14, 2012

(54) MAGNETIC LEVITATION SYSTEM

(75) Inventors: Takashi Mamba, Kitakyushu (JP);
Hiroshi Nakamura, Kitakyushu (JP);
Wennong Zhang, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 159 days.

(21) Appl. No.: 12/686,389

(22) Filed: Jan. 13, 2010

(65) Prior Publication Data
US 2010/0109448 A1 May 6, 2010

Related U.S. Application Data

(63) Continuation of application No. PCT/JP2008/063262, filed on Jul. 24, 2008.

(30) Foreign Application Priority Data

Sep. 4, 2007 (JP) ................................. 2007-228727

(51) Int. Cl.
*H02K 41/00* (2006.01)
(52) U.S. Cl. .................. 310/12.31; 310/90.5; 310/12.25
(58) Field of Classification Search ............. 310/90.5, 310/12.24, 12.25, 12.31
See application file for complete search history.

(56) References Cited

U.S. PATENT DOCUMENTS

| 5,309,049 A * | 5/1994 | Kawada et al. ............ 310/12.31 |
| 6,184,596 B1 * | 2/2001 | Ohzeki ....................... 310/12.06 |
| 6,313,558 B1 * | 11/2001 | Abukawa et al. ............. 310/429 |
| 7,199,492 B2 * | 4/2007 | Hashimoto et al. ........ 310/12.25 |
| 2004/0007922 A1 | 1/2004 | Kang et al. |

FOREIGN PATENT DOCUMENTS

| JP | 50-027219 | 3/1975 |
| JP | 01-085503 | 3/1989 |
| JP | 2003-284313 | 10/2003 |
| JP | 2006-072398 | 3/2006 |
| JP | 2006-201092 | 8/2006 |

* cited by examiner

*Primary Examiner* — Dang D Le
(74) *Attorney, Agent, or Firm* — Ditthavong Mori & Steiner, P.C.

(57) ABSTRACT

A magnetic levitation system includes a levitation-actuator movable element which generates a levitation force applied to a control object; and a levitation-actuator stator which receives a reactive force while the control object is being operated, the levitation-actuator stator being attached to a fixed or movable structure. The levitation-actuator stator includes levitation-actuator stator units connectable to each other in a travelling direction. Each levitation-actuator stator unit includes a coil and an iron core for generating a levitation force between the levitation-actuator stator unit and the levitation-actuator movable element. A length of an end portion of each iron core is equal to or larger than a length of each coil between the ends of the coil so that the cores are continuously arranged without gaps therebetween when the levitation-actuator stator units are connected to each other in the travelling direction.

4 Claims, 8 Drawing Sheets

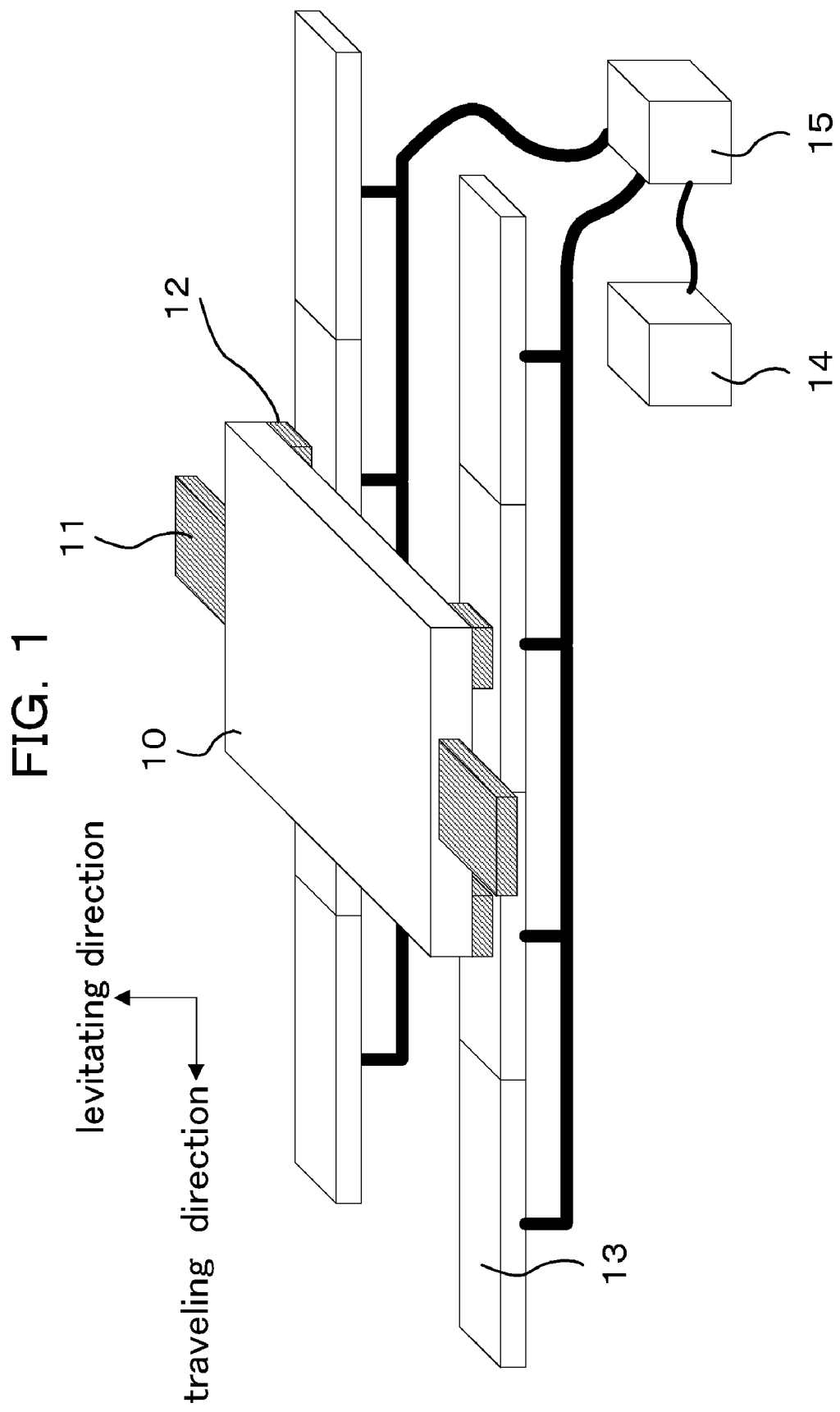

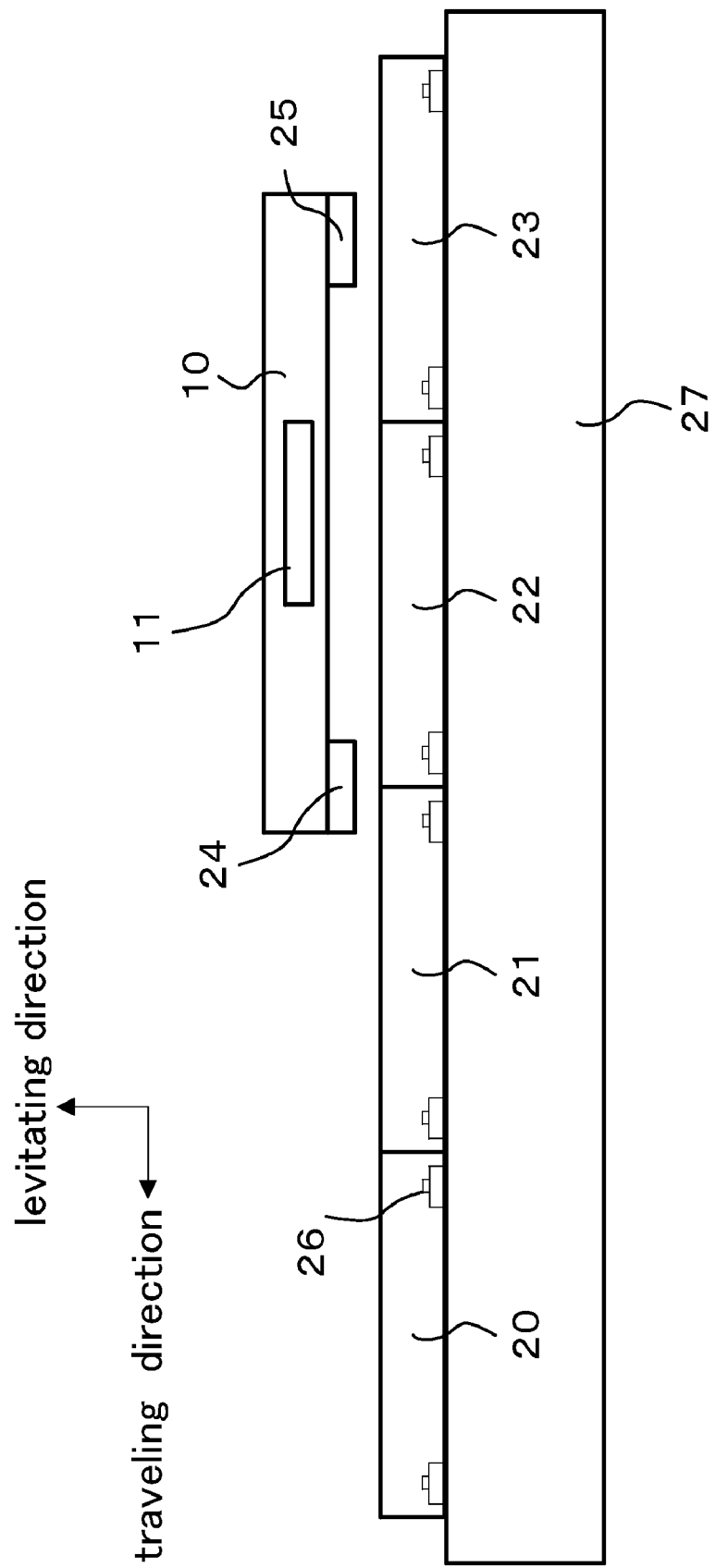

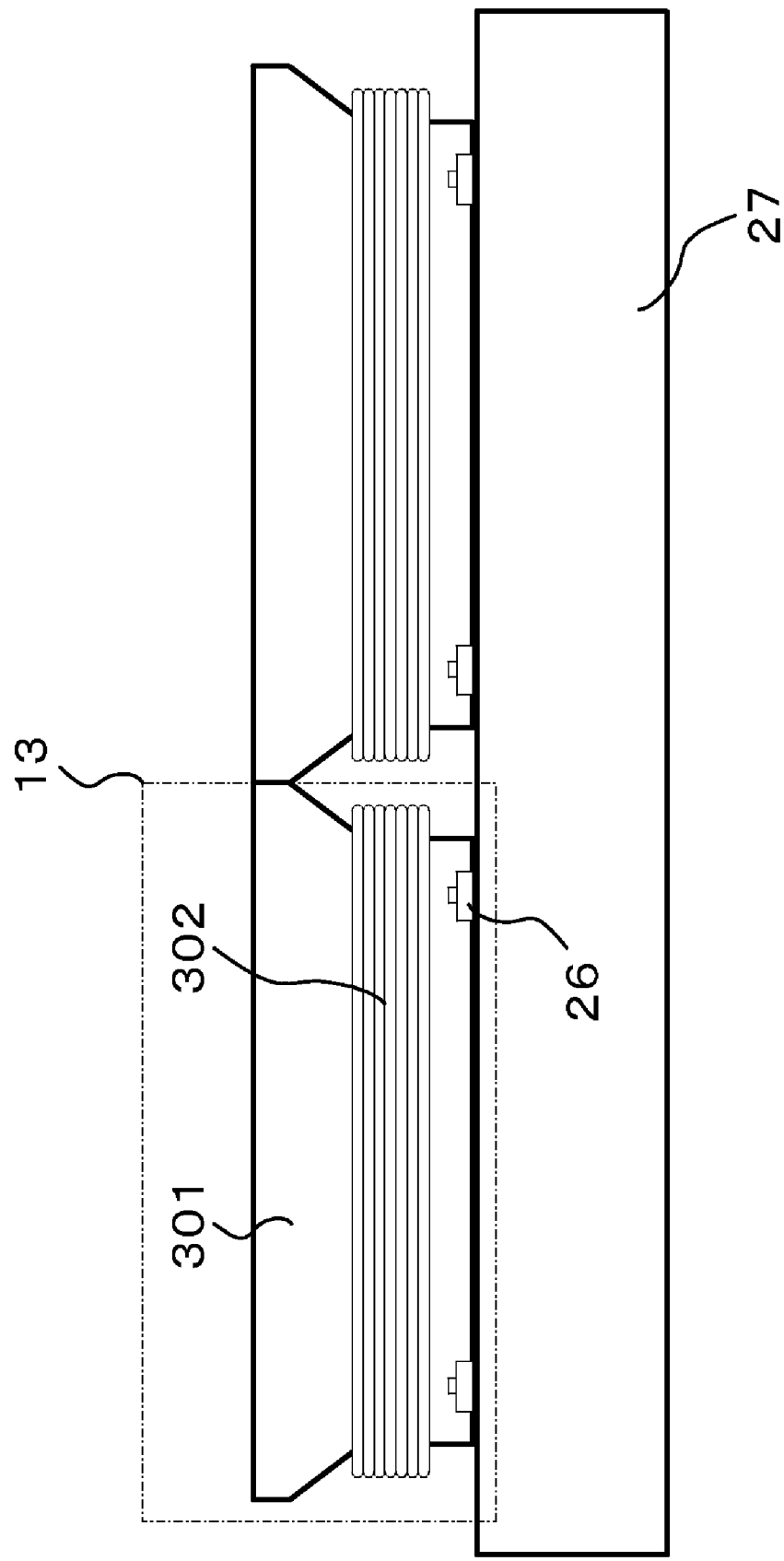

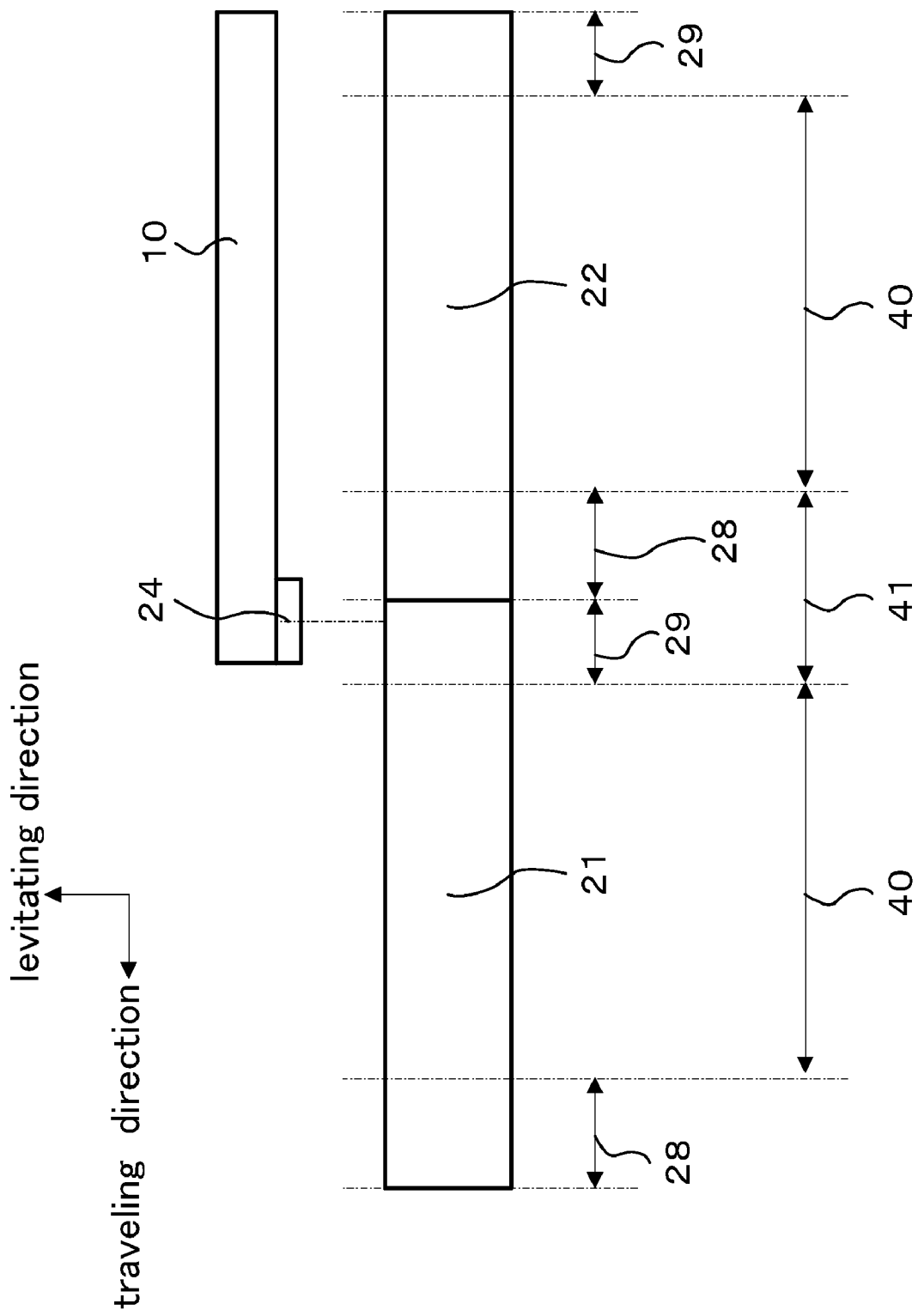

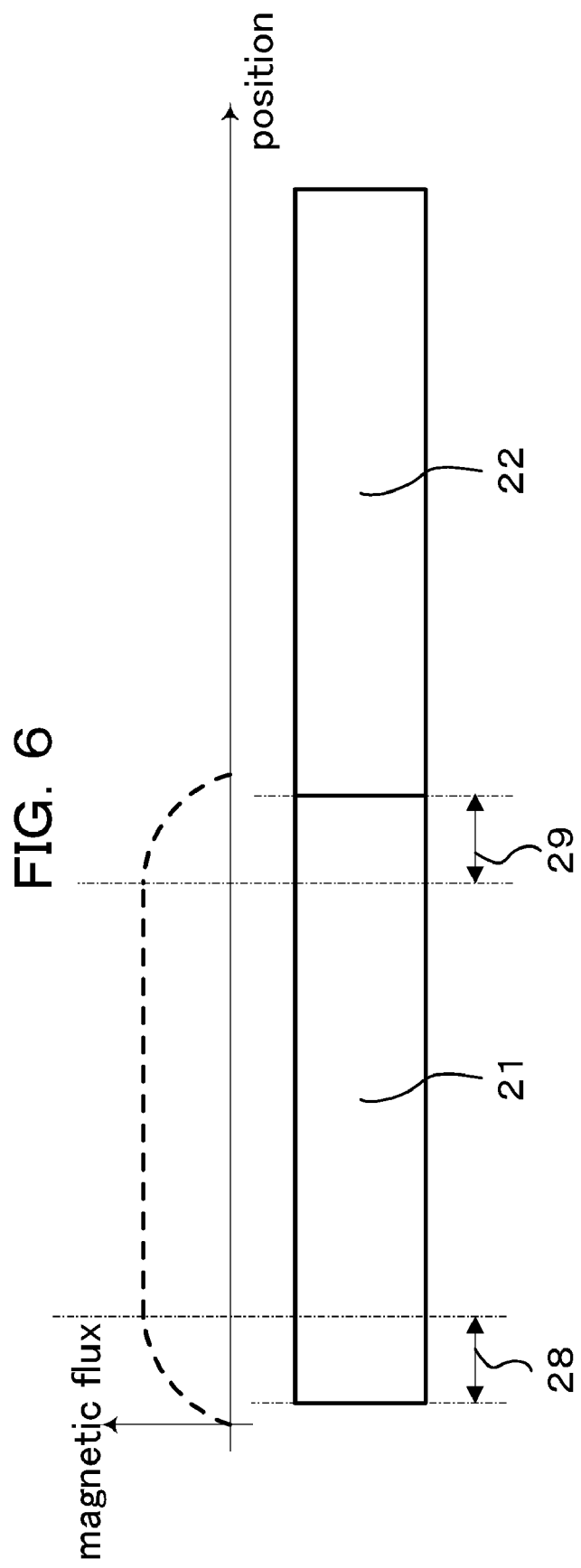

US 8,115,349 B2

MAGNETIC LEVITATION SYSTEM

CROSS-REFERENCE TO RELATED APPLICATIONS

The present application is a continuation application of PCT/JP2008/063262, filed Jul. 24, 2008, which claims priority to Japanese Patent Application No. 2007-228727, filed Sep. 4, 2007. The contents of these applications are incorporated herein by reference in their entirety.

BACKGROUND OF THE INVENTION

1. Field of the Invention

The present invention relates to a magnetic levitation system.

2. Discussion of the Background

In a magnetic levitation system according to a related art, as described in Japanese Unexamined Patent Application Publication Nos. 2006-201092 and 2006-72398, a dedicated controller or motor is developed in accordance with the structure of a sensor or an actuator of a control object.

SUMMARY OF THE INVENTION

According to one aspect of the present invention, a magnetic levitation system includes a levitation-actuator movable element which generates a levitation force applied to a control object; and a levitation-actuator stator which receives a reactive force while the control object is being operated, the levitation-actuator stator being attached to a fixed or movable structure. The levitation-actuator stator includes levitation-actuator stator units connectable to each other in a travelling direction. Each levitation-actuator stator unit includes a coil and an iron core for generating a levitation force between the levitation-actuator stator unit and the levitation-actuator movable element. A length of an end portion of each iron core is equal to or larger than a length of each coil between the ends of the coil so that the cores are continuously arranged without gaps therebetween when the levitation-actuator stator units are connected to each other in the travelling direction.

According to another aspect of the present invention, a magnetic levitation system includes levitation-actuator movable elements which generate a levitation force applied to a control object; levitation-actuator stators receiving a reactive force while the control object is being operated, the levitation-actuator stators being attached to a fixed or movable structure; a current controller which controls a current that flows through the levitation-actuator stators; a position sensor which detects a position and an orientation of the control object; and a controller which determines a current command applied to the current controller so that the control object is suspended by magnetic levitation, the current command being determined on the basis of information of the position and the orientation detected by the position sensor. At least one of the levitation-actuator stators includes levitation-actuator stator units that are connected to each other.

According to another aspect of the present invention, the current controller independently controls a current applied to each of the levitation-actuator stator units that are connected to each other, and the position sensor includes a travelling-direction position sensor which detects a position of the control object in the travelling direction. The controller selects at least one of the levitation-actuator stator units for each of the levitation-actuator movable elements in accordance with the position of the control object in the travelling direction, and applies the current command such that the control object is levitated only by the selected levitation-actuator stator unit or levitation-actuator stator units while setting the current command for the other levitation-actuator stators to a zero value.

According to another aspect of the present invention, a magnetic levitation system includes levitation-actuator movable elements which generate a levitation force applied to a control object; levitation-actuator stators receiving a reactive force while the control object is being operated, the levitation-actuator stators being attached to a fixed or movable structure; a current controller which controls a current that flows through the levitation-actuator stators; a position sensor which detects a position and an orientation of the control object; and a controller which determines a current command applied to the current controller so that the control object is suspended by magnetic levitation, the current command being determined on the basis of information of the position and the orientation detected by the position sensor. At least one of the levitation-actuator stators includes levitation-actuator stator units that are connected to each other. Each levitation-actuator stator unit includes a first end-effect region and a second end-effect region in which a magnetic flux is smaller than that in a central region owing to an end effect. A length of each levitation-actuator stator unit in a travelling direction is smaller than a length obtained by subtracting lengths of the first and second edge-effect regions from a distance between the levitation-actuator movable elements that generate the levitation force between the levitation-actuator stator unit and the levitation-actuator movable elements.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a diagram illustrating the structure of a magnetic levitation system according to an embodiment;

FIG. 2 is a side view of the magnetic levitation system according to the embodiment;

FIG. 3 is a side view of levitation-motor stator units according to the embodiment;

FIG. 5 is a side view of a connecting section of the levitation-motor stator units according to the embodiment;

FIG. 6 is a diagram illustrating a magnetic field formed by the levitation-motor stator units according to the embodiment;

DESCRIPTION OF THE EMBODIMENTS

Figure 4A:
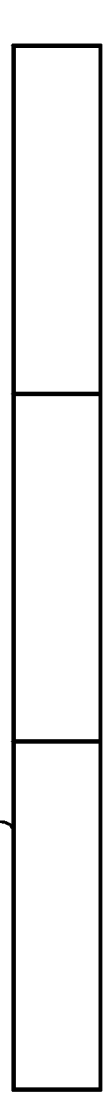
FIGS. 4A to 4F are top views of levitation-motor stator units according to the embodiment.

Embodiments will now be described with reference to the accompanying drawings, wherein like reference numerals designate corresponding or identical elements throughout the various drawings.

FIG. 1 is a diagram illustrating the overall structure of a magnetic levitation system according to a first embodiment. In FIG. 1, a control object 10 is suspended by magnetic levitation in the vertical direction, and is movable in a travelling direction. In the present embodiment, the control object 10 is a multiple-degree-of-freedom stage designed by a user. Each propulsion-motor movable element 11 generates a thrust in the travelling direction between the propulsion-motor movable element 11 and a propulsion-motor stator (not shown). In FIG. 1, a single motor is disposed at each of the left and right sides with respect to the travelling direction. Levitation-motor movable elements 12 are arranged at four corners of the control object 10. A plurality of levitation-motor stator units 13 are connected to each other in the travelling direction, so that a stroke can be freely designed. In the first embodiment, it is assumed that voice coil motors are used as levitation actuators. However, other various kinds of actuators, such as reluctance motors and static motors, may also be used. The levitation-motor stator units 13 may also be connected to each other in the left-right direction and be arranged in a tile-like pattern so that the control object 10 can be moved in two horizontal directions. In FIG. 1, the levitation-motor stator units 13 are arranged in two rows at the left and right sides with respect to the travelling direction, each row including four levitation-motor stator units 13. A controller 14 performs feedback control using information regarding the position and orientation of the control object 10 detected by a position sensor (not shown), and supplies a current command to a current controller 15 so that the control object 10 is suspended by magnetic levitation. The position information of each actuator is necessary to perform the feedback control. In the present embodiment, each motor is integrated with a position detection sensor so that the motor and the position detection sensor serve as a single motor unit, and the user can arrange each motor unit at an arbitrary position with respect to the control object 10 (hereinafter referred to as the multiple-degree-of-freedom stage 10). Therefore, the controller 14 is provided with an input device through which arrangement information of the motor units is input. In the present invention, the levitation-motor stator units 13 are connected to each other in the travelling direction, and the arrangement information of each levitation-motor stator unit 13 is input. Alternatively, if a length L of each levitation-motor stator unit 13 is stored in a memory in the controller 14 in advance, the positions (x1, y1) and (x2 and y2) of two levitation-motor stator units 13, i.e., one levitation-motor stator units 13 in each of the left and right rows, and the number of levitation-motor stator units 13 connected to each other in each row may be input. In such a case, the positions of, for example, the levitation-motor stator units 13 in front of the two levitation-motor stator units 13 may be determined as (x1, y1+L) and (x2 and y2+L). The controller 14 can control a position in the levitating direction, a rolling angle, and a pitching angle of the control object when three or more levitation-motor movable elements 12 are arranged. Therefore, the controller 14 can not only retain the control object in a horizontal orientation with a constant gap under the control object, but can also apply position and orientation commands and perform a control such that the levitation position and the orientation determined by the rolling angle and the pitching angle follow the commands. The current controller 15 receives the current command from the controller 14 and controls a current which flows through each of the levitation-motor stator units 13. Although not shown FIG. 1, also in the left-right direction, which is perpendicular to both the levitating direction and the travelling direction, the control object may be supported without contact by using a repulsive force generated by a permanent magnet, or the position of the control object may be controlled by using an additional actuator or an additional row of levitation-motor stator units 13 arranged in the left-right direction. The levitation motors have a function of correcting a displacement of the control object in the left-right direction when the levitation motors generate a levitation force. Therefore, when this function is used, it is not necessary to additionally provide an actuator or a permanent magnet for supporting or controlling the position of the control object in the left-right direction.

A method for applying the current command to each of the levitation-motor stator units will now be described below with reference to FIG. 2. FIG. 2 shows levitation-motor stator units 20 to 23 which are connected to each other and levitation-motor movable elements 24 and 25. The row of levitation-motor stator units 20 to 23 shown in FIG. 2 corresponds to one of the two rows at the left and right sides in FIG. 1. A fixed structure 27 is a structure which receives a reactive force when the multiple-degree-of-freedom stage 10 is moved. The fixed structure 27 may be fixed to the floor, or be provided as a counter mass which is moved by the received reactive force so that the reactive force is not transmitted to the floor. Connecting-fixing mechanisms 26 are provided to secure the levitation-motor stator units 20 to 23 in such a manner that the levitation-motor stator units 20 to 23 are connected to each other. In the present embodiment, the connecting-fixing mechanisms 26 are holes which receive bolts for fixing the levitation-motor stator units 20 to 23 to the fixed structure 27. Intervals between taps formed in the fixed structure 27 are determined such that the levitation-motor stator units 20 to 23 can be connected to each other without gaps therebetween. The connecting-fixing mechanisms 26 may also have a function of fixing the levitation-motor stator units 20 to 23 to each other.

Referring to FIG. 2, it is assumed that the levitation-motor movable element 25 on the multiple-degree-of-freedom stage 10 is positioned above the levitation-motor stator unit 23 and the levitation-motor movable element 24 is positioned above a connecting section between the levitation-motor stator unit 21 and the levitation-motor stator unit 22. In this state, even if a current is applied to the levitation-motor stator unit 20, neither the levitation force nor the thrust is applied to the multiple-degree-of-freedom stage 10. Therefore, the current command applied to the levitation-motor stator unit 20 is set to a zero value. The levitation force generated at the levitation-motor movable element 25 can be controlled by a current which flows through a coil included in the levitation-motor stator unit 23. In contrast, the levitation-motor movable element 24 is positioned above the connecting section between the levitation-motor stator unit 21 and the levitation-motor stator unit 22. Therefore, the levitation force is controlled using both the levitation-motor stator unit 21 and the levitation-motor stator unit 22. Each levitation-motor stator unit is designed such that a magnetic flux generated by a coil included therein is uniform in a central region of the levitation-motor stator unit. However, the magnetic field is weak at the ends of each levitation-motor stator unit, owing to the end effect. Therefore, the adjacent units are connected to each other so that a uniform, continuous magnetic field can be obtained at the connecting section therebetween. The degree of uniformity of the magnetic field obtained by the levitation-motor stator units varies depending on the shapes thereof. The shapes of the levitation-motor stator units will be described below with reference to FIGS. 3 and 4A to 4F.

Figure 7:
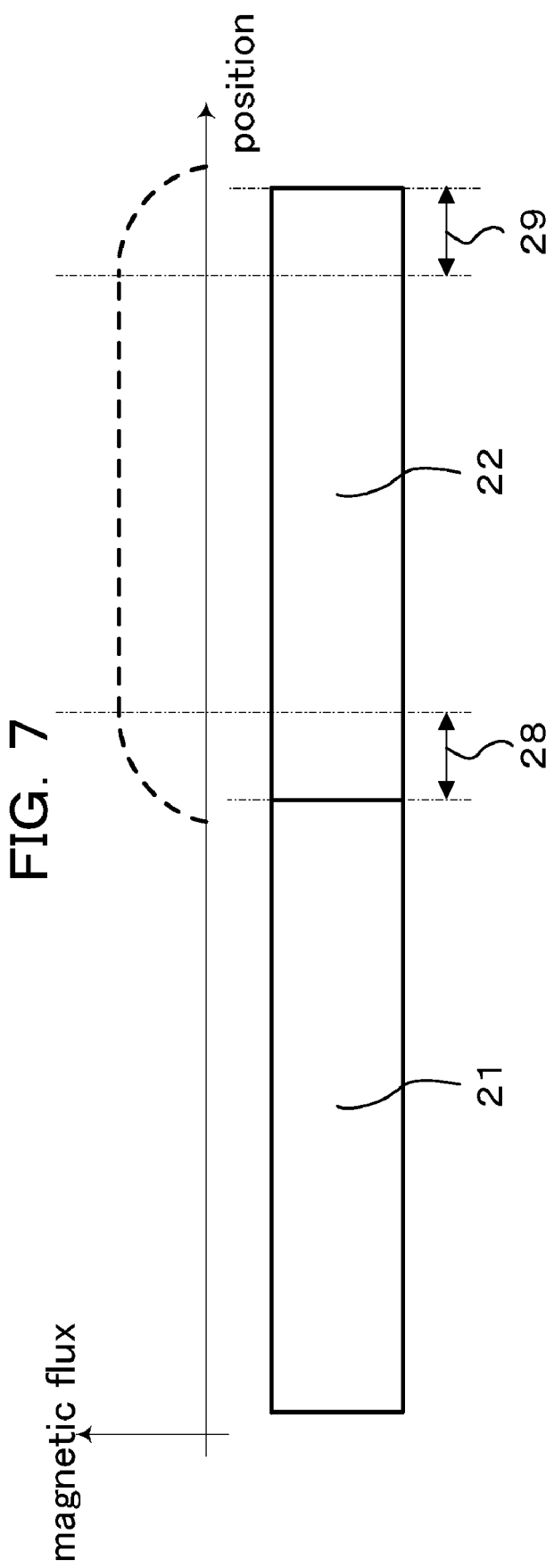
FIG. 7 is another diagram illustrating a magnetic field formed by the levitation-motor stator units according to the embodiment.
Figure 8:
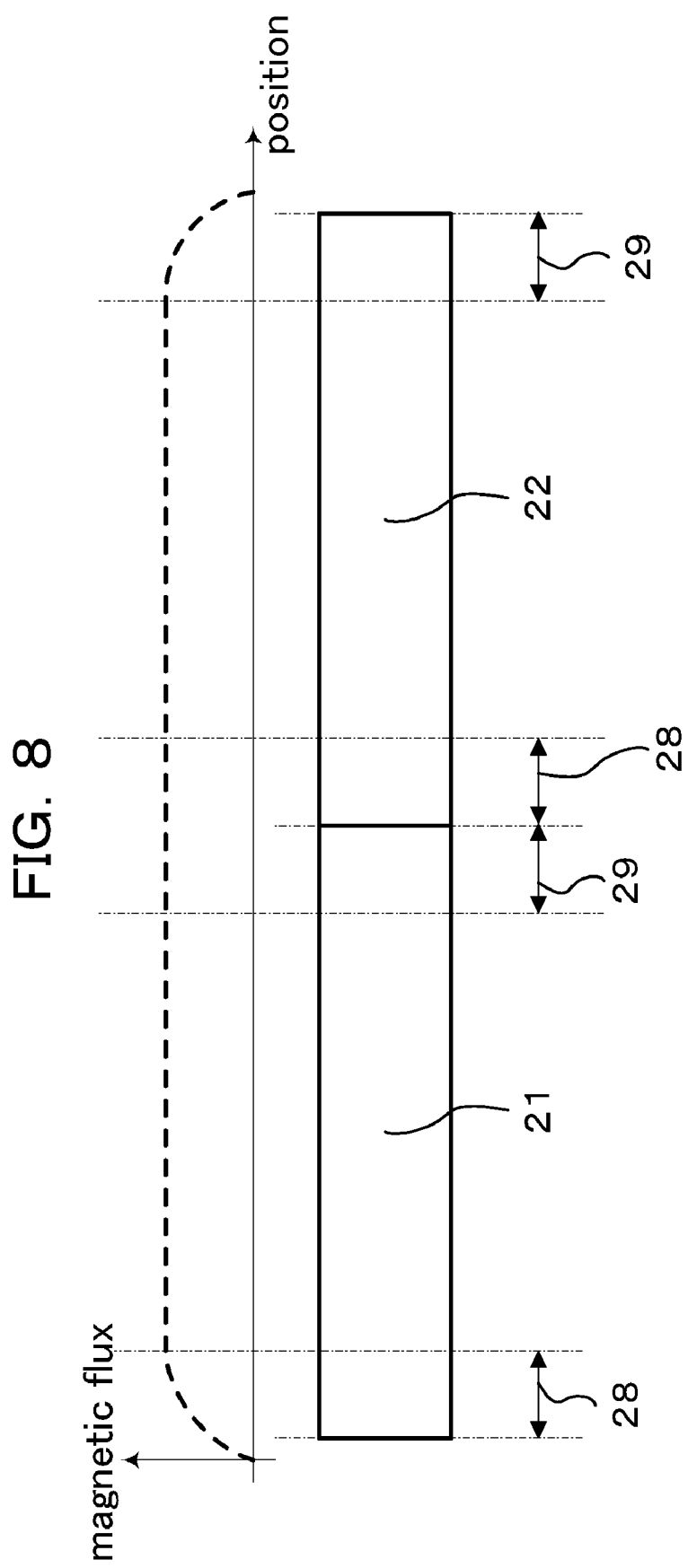
FIG. 8 is another diagram illustrating a magnetic field formed by the levitation-motor stator units according to the embodiment.

An example of a connecting section will be described below with reference to FIG. 5. FIG. 5 is an enlarged view of the connecting section shown in FIG. 2. Referring to FIG. 5, owing to the end effect, the magnetic flux of each levitation-motor stator unit is smaller at the end regions than at a central region 40. In the connecting section, the end region of the levitation-motor stator unit 22 is defined as a first edge-effect region 28, and the end region of the other levitation-motor stator unit 21 is defined as a second edge-effect region 29. If the levitation-motor stator unit 21 and the levitation-motor stator unit 22 are symmetrical to each other in the travelling direction, the first edge-effect region 28 and the second edge-effect region 29 have the same length. If the levitation-motor stator unit 21 and the levitation-motor stator unit 22 are connected to each other as shown in FIG. 5, the total region including the second edge-effect region 29 of the levitation-motor stator unit 21 and the first edge-effect region 28 of the levitation-motor stator unit 22 is defined as a connecting section 41 between the levitation-motor stator unit 21 and the levitation-motor stator unit 22. Since the center of the levitation-motor movable element 24 is positioned above the connecting section 41, the levitation force is controlled using both the levitation-motor stator units 21 and 22. The magnetic fields generated by the levitation-motor stator units will now be explained with reference to FIGS. 6 to 8. It is assumed that the levitation-motor stator unit 21 and the levitation-motor stator unit 22 have the same structure and are symmetrical in the left-right direction. In addition, it is assumed that a levitation-motor movable element which generates a force between itself and the levitation-motor stator units 21 and 22 is provided with a permanent magnet having an N-pole at the bottom surface. In this case, a repulsive force is generated if a current is applied to each levitation-motor stator unit such that an N-pole is generated at the top surface thereof, and an attractive force is generated if a current is applied to each levitation-motor stator unit such that an S-pole is generated at the top surface thereof. This force is called a magnetic force. If the levitation-motor movable element includes an iron core with a high magnetic permeability, an attractive force is generated irrespective of the direction in which the current flows through each levitation-motor stator unit. This force is called a reluctance force. The levitation force is obtained as the sum of the magnetic force and the reluctance force. The magnitudes of these forces are determined by a vertical component of the magnetic field generated by the levitation-motor stator units. The dotted line in FIG. 6 shows the vertical component of the magnetic field generated above the levitation-motor stator unit 21 when a current is applied only to the levitation-motor stator unit 21. The magnetic flux generated by the levitation-motor stator unit 21 extends vertically upward to a distant position in the central region, but extends through paths that expand sideways at the end regions. Therefore, the vertical component of the magnetic field is uniform in the area above the central region, but is weak in the areas above the first edge-effect region 28 and the second edge-effect region 29. As a result, a desired levitation force cannot be obtained in the edge-effect regions. The dotted line in FIG. 7 shows the vertical component of the magnetic field generated above the levitation-motor stator unit 22 when the same current as that applied in the above-described case is applied only to the levitation-motor stator unit 22. Similar to FIG. 6, the magnetic field is weak at the ends. The dotted line in FIG. 8 shows the vertical component of the magnetic field generated above the levitation-motor stator units 21 and 22 when the same current as those applied in the above-described cases is applied to both the levitation-motor stator units 21 and 22. As shown in FIG. 8, the magnetic field generated by the second edge-effect region 29 of the levitation-motor stator unit 21 and the magnetic field generated by the first edge-effect region 28 of the levitation-motor stator unit 22 compensate for each other, so that a uniform magnetic field is formed. As a result, the desired levitation force can be generated. Referring to FIG. 2 again, when the multiple-degree-of-freedom stage 10 moves in the travelling direction (leftward in FIG. 2), the influence of the end effect decreases as the levitation-motor movable element 24 approaches the central region of the levitation-motor stator unit 21. Then, a uniform magnetic field can be obtained only by the magnetic flux generated by the levitation-motor stator unit 21, and the desired levitation force can be generated only by the levitation-motor stator unit 21. Therefore, the current command applied to the levitation-motor stator unit 22 is set to zero. Then, when the multiple-degree-of-freedom stage 10 is moved further in the travelling direction and the levitation-motor movable element 25 approaches the connecting section between the levitation-motor stator unit 22 and the levitation-motor stator unit 23, the levitation force generated at the levitation-motor movable element 25 is controlled using both the levitation-motor stator units 22 and 23. Then, when the multiple-degree-of-freedom stage 10 is further moved in the travelling direction and the levitation-motor movable element 25 approaches the central region of the levitation-motor stator unit 22, the current command applied to the levitation-motor stator unit 23 is set to zero. Then, when the multiple-degree-of-freedom stage 10 is moved further in the travelling direction and the levitation-motor movable element 24 approaches the connecting section between the levitation-motor stator unit 20 and the levitation-motor stator unit 21, the levitation force generated at the levitation-motor movable element 24 is controlled using both the levitation-motor stator units 20 and 21. In this manner, the levitation-motor stator units to which the current is to be applied is selected in accordance with the position of the multiple-degree-of-freedom stage 10. One or two levitation-motor stator units is/are selected for each levitation-motor movable element, and the current command is applied to levitate the control object using only the selected levitation-motor stator units. The current command applied to the remaining levitation-motor stator units is set to zero, so that the power consumption can be reduced. To perform this control, the length of each levitation-motor stator unit is to be smaller than the distance between the levitation-motor movable elements, as shown in FIG. 2. If the length of each levitation-motor stator unit is equal to the interval between the levitation-motor movable elements, the levitation-motor movable elements reach the connecting sections at the same time. Therefore, it becomes difficult to individually control the levitation forces applied to the levitation-motor movable element 24 and the levitation-motor movable element 25. In addition, to perform the control for eliminating the influence of the end effect by using two levitation-motor stator units at the connecting section and using a single levitation-motor stator unit at the central region, the length of each levitation-motor stator unit in the travelling direction must be smaller than the length obtained by subtracting the lengths of the first and second edge-effect regions 28 and 29 from the distance between the levitation-motor movable elements 24 and 25. Otherwise, the levitation-motor movable element 25 reaches the first edge-effect region 28 of the levitation-motor stator unit 23 before the levitation-motor movable element 24 passes through the second edge-effect region 29 of the levitation-motor stator unit 21 and enters the central region thereof. In such a case, the levitation-motor stator unit 22 cannot control both the levitation-motor movable element 24 and the levitation-motor movable element 25 at the same time.

The shape of each levitation-motor stator unit will now be described with reference to FIG. 3. In FIG. 3, a coil 302 generates a magnetic flux in the levitating direction when a current flows through the coil 302. An iron core 301 is provided to reduce the leakage of the magnetic flux generated by the coil 302 and increase the strength of the generated levitation force. The iron core 301 is composed of, for example, a laminate of silicon copper plates to reduce the iron loss. General levitation-motor stator units have a substantially rectangular parallelepiped shape. Therefore, when the levitation-motor stator units are brought close to each other, the coils wound around the levitation-motor stator units interfere with each other and a gap will be provided between the iron cores positioned next to each other. A large magnetic resistance is generated at the gap, and the magnetic flux cannot easily pass through the gap. Therefore, the magnetic flux is reduced in the connecting section and it is difficult to obtain a desired levitation force. In the present embodiment, the length of an end portion of the iron core 301 is set to be equal to or larger than the length of the coil 302 between the ends thereof. Therefore, when the levitation-motor stator units are connected to each other, upper portions of the iron cores can be brought into contact with each other. In this case, the magnetic resistance at the connecting section is substantially equal to that at the central region. Therefore, a magnetic flux having a uniform density can be obtained in an area which extends to the connecting section. As a result, when the adjacent levitation-motor stator units are excited simultaneously, a uniform magnetic field can be generated at the connecting section therebetween. Thus, the stator units can be connected to each other without causing a reduction in the levitation force.

FIG. 3 is a side view viewed in a certain direction. However, also in other side views viewed in directions perpendicular to that in FIG. 3, the length of an end portion of the iron core may be set to be equal to or larger than the length of the coil between the ends thereof. When the levitation-motor stator units having such a shape are arranged in a tile-like pattern, the object can be suspended by magnetic levitation along a plane.

Figure 4B:
Figure 4C:
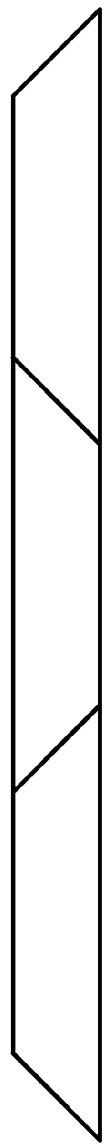
Figure 4D:
Figure 4E:
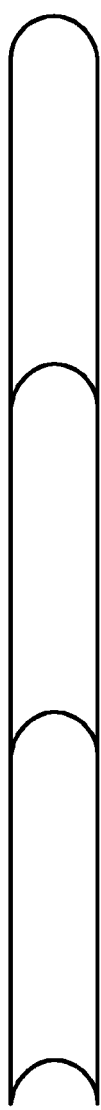
Figure 4F:
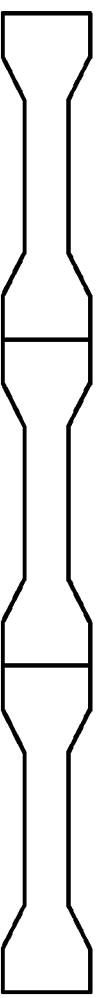

FIGS. 4A to 4F are diagrams illustrating the shapes of the levitation-motor stator units viewed from the top. The shape of each iron core viewed from the top is not limited to a rectangle as shown in FIG. 4A, and may also be a parallelogram as shown in FIG. 4B or a trapezoid as shown in FIG. 4C. In the case where the iron cores have the above-mentioned shapes, variation in the magnetic field can be distributed over the connecting section. Therefore, when the adjacent levitation-motor stator units are excited simultaneously, a substantially uniform magnetic field can be generated at the connecting section. Thus, the stator units can be connected to each other without causing a reduction in the levitation force. In addition, the shape of each iron core may also have an irregular surface, such as a V-shaped surface as shown in FIG. 4D or a curved surface as shown in FIG. 4E. If the iron cores have these shapes, in addition to the above-described effects, additional effects can be obtained that the units connected to each other can be easily positioned when they are fixed and that the resistance of the structure to sideways force can be increased. In addition, the width of each iron core can be increased at the ends thereof, as shown in FIG. 4F. In the case where each iron core is shaped as shown in FIG. 4F, the area of the magnetic path can be increased at the ends of the iron core to compensate for the reduction in the magnetic flux density, so that the magnetic flux equivalent to that at the central region of the iron core can be obtained at the ends thereof. Owing to these effects, the influence of the end effect can be reduced when, in particular, only one of the levitation-motor stator units is excited. In addition, the shapes shown in FIGS. 4B to 4E may be used in combination with the shape shown in FIG. 4F. More specifically, the widths of each iron core may be increased at the ends thereof, and the connection surfaces thereof may be shaped as shown in one of FIGS. 4B to 4E.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A magnetic levitation system, comprising:
    levitation-actuator movable elements which generate a levitation force applied to a control object;
    levitation-actuator stators receiving a reactive force while the control object is being operated, the levitation-actuator stators being attached to a fixed or movable structure;
    a current controller which controls a current that flows through the levitation-actuator stators;
    a position sensor which detects a position and an orientation of the control object; and
    a controller which determines a current command applied to the current controller so that the control object is suspended by magnetic levitation, the current command being determined on the basis of information of the position and the orientation detected by the position sensor,
    wherein at least one of the levitation-actuator stators includes levitation-actuator stator units that are connected to each other,
    wherein the controller includes an input device configured to receive first information from outside of the magnetic levitation system, the first information including number and positions of the levitation-actuator stator units and target positions of the levitation-actuator movable elements, and
    wherein the controller generates the current command for each of the levitation-actuator stator units on the basis of the first information.

2. The magnetic levitation system according to claim 1,
    wherein the current controller independently controls a current applied to each of the levitation-actuator stator units that are connected to each other,
    wherein the position sensor includes a travelling-direction position sensor which detects a position in the travelling direction, and
    wherein the controller selects at least one of the levitation-actuator stator units for each of the levitation-actuator movable elements in accordance with the position in the travelling direction, and applies the current command such that the control object is levitated only by the selected levitation-actuator stator unit or levitation-actuator stator units while setting the current command for the other levitation-actuator stators to a zero value.

3. A magnetic levitation system, comprising:
    levitation-actuator movable elements which generate a levitation force applied to a control object;
    levitation-actuator stators receiving a reactive force while the control object is being operated, the levitation-actuator stators being attached to a fixed or movable structure;
    a current controller which controls a current that flows through the levitation-actuator stators;
    a position sensor which detects a position and an orientation of the control object; and
    a controller which determines a current command applied to the current controller so that the control object is suspended by magnetic levitation, the current command being determined on the basis of information of the position and the orientation detected by the position sensor, wherein at least one of the levitation-actuator stators includes levitation-actuator stator units that are connected to each other, wherein each levitation-actuator stator unit includes a first end-effect region and a second end-effect region in which a magnetic flux is smaller than that in a central region owing to an end effect, and wherein a length of each levitation-actuator stator unit in a travelling direction is smaller than a length obtained by subtracting lengths of the first and second edge-effect regions from a distance between the levitation-actuator movable elements that generate the levitation force between the levitation-actuator stator unit and the levitation-actuator movable elements.

4. The magnetic levitation system according to claim 3, wherein, when one of the levitation-actuator movable elements is above the first end-effect region of one of the levitation-actuator stator units, the controller selects the one of the levitation-actuator stator units and the levitation-actuator stator unit adjacent to the first end-effect region of the one of the levitation-actuator stator units, wherein, when one of the levitation-actuator movable elements is above the second end-effect region of one of the levitation-actuator stator units, the controller selects the one of the levitation-actuator stator units and the levitation-actuator stator unit adjacent to the second end-effect region of the one of the levitation-actuator stator units, wherein, when one of the levitation-actuator movable elements is above the central region excluding the first end-effect region and the second end-effect region of one of the levitation-actuator stator units, the controller selects the one of the levitation-actuator stator units, and wherein the controller applies the control signal such that the control object is levitated by the selected levitation-actuator stator unit or levitation-actuator stator units.

* * * * *